United States Patent
Morioka et al.

(10) Patent No.: US 6,840,996 B2
(45) Date of Patent: Jan. 11, 2005

(54) CEMENT COMPOSITION

(75) Inventors: Minoru Morioka, Niigata (JP); Yasuhiro Nakashima, Niigata (JP); Takayuki Higuchi, Niigata (JP); Mitsuo Takahashi, Niigata (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 10/363,698

(22) PCT Filed: Sep. 13, 2001

(86) PCT No.: PCT/JP01/07968
§ 371 (c)(1),
(2), (4) Date: Mar. 12, 2003

(87) PCT Pub. No.: WO02/22518
PCT Pub. Date: Mar. 21, 2002

(65) Prior Publication Data
US 2004/0007162 A1 Jan. 15, 2004

(30) Foreign Application Priority Data
Sep. 13, 2000 (JP) ........................................ 2000-277493

(51) Int. Cl.$^7$ ............................. C04B 7/14; C04B 18/14
(52) U.S. Cl. ........................................ 106/714; 106/789
(58) Field of Search ................................ 106/714, 789, 106/713

(56) References Cited

U.S. PATENT DOCUMENTS

| | | | |
|---|---|---|---|
| 4,877,452 A | * 10/1989 | Roussel et al. | 106/715 |
| 4,964,912 A | * 10/1990 | Okabayashi et al. | 106/705 |
| 4,983,220 A | * 1/1991 | Mathieu | 106/692 |
| 5,121,795 A | * 6/1992 | Ewert et al. | 166/292 |
| 5,123,487 A | * 6/1992 | Harris et al. | 166/277 |
| 5,238,064 A | * 8/1993 | Dahl et al. | 166/293 |
| 5,584,926 A | * 12/1996 | Borgholm et al. | 106/713 |
| 6,241,816 B1 | * 6/2001 | Ronin | 106/735 |

FOREIGN PATENT DOCUMENTS

| | | | |
|---|---|---|---|
| JP | 60-135478 A | * | 7/1986 |
| JP | 5-208853 | | 8/1993 |
| JP | 7-61852 | | 3/1995 |
| JP | 2001-294459 | | 10/2001 |
| JP | 2002-160959 A | * | 6/2002 |

OTHER PUBLICATIONS

Yoshio Kasai edition Concrete Soukan, $1^{st}$ edition, Gijutsu Shoin, p. 68, table 1.8.8; p. 219, table 5.5.6 Jun. 10, 1998.

* cited by examiner

Primary Examiner—Anthony J. Green
(74) Attorney, Agent, or Firm—Oblon, Spivak, McClelland, Maier & Neustadt, P.C.

(57) ABSTRACT

A cement composition of an environmental impact reducing type, used in the field of civil engineering and construction, which provides initial strength-development equal to that of ordinary Portland cement and which can reduce the clinker calcination amount, is provided. A cement composition containing Portland cement having a $3CaO \cdot SiO_2$ content of at least 60% and a slowly cooled blast furnace slag powder, wherein the content of the slowly cooled blast furnace slag powder is from 10 to 50 parts per 100 parts of the cement composition.

8 Claims, No Drawings

CEMENT COMPOSITION

TECHNICAL FIELD

The present invention relates to a cement composition which is to be used mainly in the field of civil engineering and construction.

Part(s) and % used in the present specification are based on mass unless otherwise specified.

BACKGROUND ART

In recent years, environmental problems have been elicited, and reduction in environmental impact has been required in each field.

As the proportion of the amount of carbon dioxide discharged in the field of civil engineering and construction is extremely high based on that in the entire industries, reduction of environmental impact has been eagerly desired particularly in the field of civil engineering and construction.

Most of carbon dioxide discharged in the cement industry is derived from calcination of limestone as a material and burning of fuel used at the time of calcination.

Accordingly, in order to reduce the carbon dioxide emission, it is the most effective method to reduce the amount of calcination of cement clinker, and it is extremely important to promote use of various blended cements having various admixtures mixed therewith with a reduced amount of cement.

However, there has been such a problem that the blended cement is poor in initial strength-development.

The initial strength is deeply relevant to the release cycle and therefore is important in order to shorten the time for construction, and at present, development of a cement composition which provides favorable initial strength-development, particularly strength-development equal to that of ordinary Portland cement even when an admixture is used in an amount exceeding 30%, has been desired.

On the contrary, a slowly cooled blast furnace slag formed as a by-product in a steel plant, is utilized for a roadbed material or a cement material, however, the amount treated is very slight relative to the amount generated, and its effective use has been in search yet.

Accordingly, the present inventors have been conducted extensive studies to overcome the above problems and as a result, they have found that favorable initial strength-development can be obtained by use of a cement composition containing Portland cement having a $3CaO.SiO_2$ content of at least 60% and a slowly cooled blast furnace slag powder, and particularly, a cement composition using a slowly cooled blast furnace slag powder in an amount of from 10 to 50% provides strength-development equal to that of ordinary Portland cement. The present invention has been accomplished on the basis of these discoveries.

DISCLOSURE OF THE INVENTION

Namely, the present invention provides a cement composition containing Portland cement having a $3CaO.SiO_2$ content of at least 60% and a slowly cooled blast furnace slag powder, and the cement composition wherein the content of the slowly cooled blast furnace slag powder is from 10 to 50 parts per 100 parts of the cement composition.

BEST MODE FOR CARRYING OUT THE INVENTION

Now, the present invention will be explained in further detail.

The Portland cement having a $3CaO.SiO_2$ (hereinafter referred to as $C_3S$) content of at least 60% (hereinafter sometimes referred to as a cement substance) used in the present invention is one having a $C_3S$ content of at least 60%, and contents of $3CaO.Al_2O_3$, $4CaO.Al_2O_3.Fe_2O_3$, $2CaO.SiO_2$ and gypsum are not particularly limited. As the Portland cement, a mixture of at least two types of Portland cements having different compositions may be used, and in such a case, the $C_3S$ content represents the weighted average of the $C_3S$ contents of the respective Portland cements contained in the mixture.

In general, the Portland cement is composed of clinker mainly composed of $C_2S$, $C_3S$, $C_3A$ and $C_4AF$, and gypsum, where CaO, $SiO_2$, $Al_2O_3$ and $Fe_2O_3$ are represented as C, S, A and F, respectively.

As the cement substance, use of high-early-strength cement or ultra high-early-strength cement is preferred, and they are available as commercial products.

The particle size of the cement substance is not particularly limited, but is usually preferably at a level of from 3,000 to 8,000 $cm^2/g$ as the Blaine specific surface area value (hereinafter referred to as Blaine value). If it is less than 3,000 $cm^2/g$, such an effect of the present invention that the initial strength-development equal to that of ordinary Portland cement is obtained may not be obtained in some cases, and even when the cement substance is ground to obtain a Blaine value of 8,000 $cm^2/g$, no further increase of the effect can be expected. The above Blaine value is particularly preferably from 3,500 to 6,000 $cm^2/g$.

The slowly cooled blast furnace slag powder (hereinafter referred to as slowly cooled slag) used in the present invention is a blast furnace slag crystallized by air-cooling. The slowly cooled slag is obtained usually by pouring molten slag to a cooling yard called dry pit or field, followed by cooling by air cooling and appropriate water spring, and is obtained as crystalline block slag.

The proportion of chemical components in the slowly cooled slag is not particularly limited, but in general, $SiO_2$ is from 25 to 45%, CaO is from 30 to 50%, $Al_2O_3$ is from 10 to 20%, and MgO is from 3 to 10%, which are the main components. In addition, $Na_2O$, $K_2O$, $Fe_2O_3$, MnO, $TiO_2$, S and the like are contained in an amount of at most 2%, respectively, which are trace constituents.

The Blaine value of the slowly cooled slag preferably exceeds 4,000 $cm^2/g$, it is more preferably at least 4,500 $cm^2/g$, most preferably at least 5,000 $cm^2/g$. If the Blaine value is at most 4,000 $cm^2/g$, no effect of suppressing the bleeding may be obtained in some cases. On the other hand, if said Blaine value is excessively high, the amount of water kneaded tends to be large, and the strength-development and durability tend to be poor in some cases, and it is preferably at most 8,000 $cm^2/g$.

Further, the percentage of glass content of the slowly cooled slag is not particularly limited, but it is usually at most 30%, preferably at most 10%. If the percentage of glass content exceeds 30%, the heat release value tends to be high in some cases.

The percentage of glass content (X) in the present invention is obtained from the formula $X(\%)=(1-S/S_0)\times 100$. S is the area of the main peak of melilite (a solid solution of gehlenite $2CaO.Al_2O_3.SiO_2$ and akermanite $2CaO.MgO.2SiO_2$) which is a main crystalline compound in the slowly cooled slag, as obtained by a powder X-ray diffraction method, and $S_0$ represents the area of the main peak of melilite, with respect to the slowly cooled slag heated at 1,000° C. for 3 hours and then cooled at a cooling rate of 5° C./min.

The components of the slowly cooled slag are similar to the composition of the granulated blast furnace slag, and specifically, $SiO_2$, CaO, $Al_2O_3$, MgO and the like are main chemical components, and further, $TiO_2$, MnO, $Na_2O$, S, $Cr_2O_3$, $P_2O_5$, $Fe_2O_3$ and the like are mentioned.

Further, in a case of preparation of the slowly cooled slag, it may be granulated simultaneously with grinding of the clinker in the cement substance, or they may be granulated separately.

The amount of the slowly cooled slag used is not particularly limited, but usually it is preferably from 10 to 50 parts, more preferably from 30 to 40 parts, per 100 parts of the cement composition comprising Portland cement having a $C_3S$ content of at least 60% and a slowly cooled slag. If it is less than 10 parts, reduction of environmental impact tends to be insufficient, and if it exceeds 50 parts, the strength-development tends to be poor in some cases.

The particle size of the cement composition of the present invention depends on the purpose of use and application and thus it is not particularly limited, but usually it is preferably from 3,000 to 8,000 $cm^2/g$, more preferably from 4,000 to 6,000 $cm^2/g$ as the Blaine value. If it is less than 3,000 $cm^2/g$, no adequate strength-development may be obtained in some cases, and if it exceeds 8,000 $cm^2/g$, workability tends to be poor in some cases.

To prepare the cement composition of the present invention, the respective materials may be mixed at the time of application or may be preliminarily mixed.

In the present invention, an aggregate such as sand or ballast, a reinforcing fiber material, a water reducing agent, a high-range water reducing agent, a high-range AE water reducing agent, a thickner, a cement expanding agent, an antirust, an antifreezing agent, a clay mineral such as bentonite or montmorillonite, an ion-exchanger such as zeolite, hydrotalcite or hydrocalumite, fly ash, limestone powder, a granulated blast furnace slag fine powder, silica fume or the like, may be used, in addition to the cement composition, within a range not to substantially hinder the purpose of the present invention.

Now, the present invention will be explained in detail with reference to Examples.

EXPERIMENT EXAMPLE 1

With 100 parts of a cement composition comprising a cement substance and a slowly cooled slag as identified in Table 1, 50 parts of water and 300 parts of sand were mixed to prepare mortar, and the compressive strength was measured. The results are also shown in Table 1.

Materials Used

Cement substance A: ordinary Portland cement (CaO: 65.29%, $SiO_2$: 22.14%, $Al_2O_3$: 4.91%, $Fe_2O_3$: 2.96%, $SO_3$: 1.86%), $C_3S$ content: 55%

Cement substance B: high-early-strength Portland cement (CaO: 66.87%, $SiO_2$: 22.34%, $Al_2O_3$: 4.11%, $Fe_2O_3$: 2.30%, $SO_3$: 2.33%), $C_3S$ content: 65%

Cement substance C: a mixture comprising 50 parts of the cement substance A and 50 parts of the cement substance B, $C_3S$ content: 60%

Slowly cooled slag: granulated product of slowly cooled blast furnace slag (CaO: 39.50%, $SiO_2$: 31.70%, $Al_2O_3$: 14.80%, MgO: 7.20%), Blaine value: 4,500 $cm^2/g$, specific gravity: 3.00, percentage of glass content: 2%

Sand: standard sand used in JIS R 5201

Water: running water

Measuring Method

Compressive strength: measured in accordance with JIS R 5201.

TABLE 1

| Experiment No. | Cement substance Type | Cement substance Content (parts) | Slowly cooled slag content (parts) | Compressive strength (N/mm²) 1 day | 3 days | 7 days | Note |
|---|---|---|---|---|---|---|---|
| 1-1 | A | 100 | 0 | 10.5 | 23.0 | 41.0 | Comp. Ex. |
| 1-2 | A | 65 | 35 | 7.5 | 16.2 | 29.3 | Comp. Ex. |
| 1-3 | B | 65 | 35 | 13.3 | 26.4 | 44.9 | Ex. |
| 1-4 | C | 65 | 35 | 11.8 | 24.7 | 43.0 | Ex. |

EXPERIMENT EXAMPLE 2

The same operation as in Experiment Example 1 was carried out except that the cement substance B and the slowly cooled slag as identified in Table 2 were used. The results are also shown in Table 2.

TABLE 2

| Experiment No. | Cement substance Type | Cement substance Content (parts) | Slowly cooled slag content (parts) | Compressive strength (N/mm$^2$) 1 day | 3 days | 7 days | Note |
|---|---|---|---|---|---|---|---|
| 2-1 | B | 100 | 0 | 21.9 | 40.3 | 53.2 | Comp. Ex. |
| 2-2 | B | 90 | 10 | 19.5 | 39.2 | 54.1 | Ex. |
| 2-3 | B | 80 | 20 | 18.3 | 36.2 | 51.3 | Ex. |
| 2-4 | B | 70 | 30 | 15.3 | 31.8 | 47.1 | Ex. |
| 1-3 | B | 65 | 35 | 13.3 | 26.4 | 44.9 | Ex. |
| 2-5 | B | 60 | 40 | 12.6 | 25.7 | 44.3 | Ex. |
| 2-6 | B | 50 | 50 | 11.6 | 24.9 | 43.2 | Ex. |

INDUSTRIAL APPLICABILITY

By using the cement composition of the present invention, initial strength-development equal to that of ordinary Portland cement can be obtained, and the clinker calcination amount when Portland cement is calcined can be decreased, and accordingly the cement composition of an environmental impact reducing type can be obtained.

What is claimed is:

1. A cement composition containing Portland cement having a 3CaO.SiO$_2$ content of at least 60% and a slowly cooled blast furnace slag powder.

2. The cement composition, wherein the slowly cooled blast furnace slag powder is contained in an amount of from 10 to 50 parts in a total amount of 100 parts of the slowly cooled blast furnace slag powder and the Portland cement.

3. The cement composition according to claim 1, wherein the particle size of the Portland cement is from 3,000 to 8,000 cm$^2$/g as the Blaine specific surface area value.

4. The cement composition according to claim 1, wherein the slowly cooled blast furnace slag contains, as the main components, from 25 to 45% of SiO$_2$, from 30 to 50% of CaO, from 10 to 20% of Al$_2$O$_3$, and from 3 to 10% of MgO.

5. The cement composition according to claim 1, wherein the particle size of the slowly cooled blast furnace slag is at least 4,000 cm$^2$/g as the Blaine specific surface area value.

6. The cement composition according to claim 1, wherein the slowly cooled blast furnace slag has a percentage of glass content of at most 30%.

7. The cement composition according to claim 2, wherein the slowly cooled blast furnace slag powder is contained in an amount of from 30 to 40 parts in a total amount of 100 parts of the slowly cooled blast furnace slag powder and the Portland cement.

8. The cement composition according to claim 6, wherein the percentage of glass content is at most 10%.

* * * * *